(12) United States Patent
Wood et al.

(10) Patent No.: US 12,174,646 B2
(45) Date of Patent: Dec. 24, 2024

(54) INFLATORS FOR INFLATABLE WEBS WITH GAS MOVING DEVICES IN SERIES

(71) Applicant: Sealed Air Corporation (US), Charlotte, NC (US)

(72) Inventors: Andrew Thomas Wood, Charlotte, NC (US); Ricky D. McDaniel, Harrisburg, NC (US); Christian Theodore Lomascolo, Mooresville, NC (US)

(73) Assignee: Sealed Air Corporation (US), Charlotte, NC (US)

( * ) Notice: Subject to any disclaimer, the term of this patent is extended or adjusted under 35 U.S.C. 154(b) by 431 days.

(21) Appl. No.: 17/770,676

(22) PCT Filed: Oct. 21, 2020

(86) PCT No.: PCT/US2020/056567
§ 371 (c)(1),
(2) Date: Apr. 21, 2022

(87) PCT Pub. No.: WO2021/081028
PCT Pub. Date: Apr. 29, 2021

(65) Prior Publication Data
US 2022/0363029 A1     Nov. 17, 2022

Related U.S. Application Data

(60) Provisional application No. 62/924,336, filed on Oct. 22, 2019.

(51) Int. Cl.
*G05D 7/00*          (2006.01)
(52) U.S. Cl.
CPC ....... *G05D 7/00* (2013.01); *B31D 2205/0088* (2013.01)

(58) Field of Classification Search
CPC . B31D 2205/0088; B31D 5/0073; G05D 7/00
USPC .......................................................... 700/282
See application file for complete search history.

(56) References Cited

U.S. PATENT DOCUMENTS

| | | |
|---|---|---|
| 3,142,599 A | 7/1964 | Chavannes |
| 3,208,898 A | 9/1965 | Chavannes et al. |
| 3,285,793 A | 11/1966 | Chavannes |
| 3,508,992 A | 4/1970 | Chavannes |
| 3,586,565 A | 6/1971 | Fielding |

(Continued)

OTHER PUBLICATIONS

Gary Benson, et. al., Improving Fan System Performance, 1989.
(Continued)

*Primary Examiner* — Chun Cao
(74) *Attorney, Agent, or Firm* — Jon M. Isaacson

(57) ABSTRACT

An inflator inflates inflatable webs. The inflator includes a web supply holding device that holds a supply of an inflatable web, a first gas moving device having a first inlet for receiving gas and a first outlet for expelling gas, a second gas moving device having a second inlet for receiving gas and a second outlet for expelling gas, and a nozzle. The first outlet is coupled to the second inlet such that gas expelled from the first outlet is received by the second inlet. The nozzle is coupled to the second outlet and inserts gas expelled from the second outlet into the inflatable web to inflate the inflatable web. Parameters of the first and second gas moving devices are selected based on a type of the inflatable web.

20 Claims, 11 Drawing Sheets

(56) References Cited

U.S. PATENT DOCUMENTS

| | | | |
|---|---|---|---|
| 3,616,155 A | 10/1971 | Chavannes | |
| 3,660,189 A | 5/1972 | Constantine | |
| 4,181,548 A | 1/1980 | Weingarten | |
| 4,184,904 A | 1/1980 | Gaffney | |
| 4,415,398 A | 11/1983 | Ottaviano | |
| 4,576,669 A | 3/1986 | Caputo | |
| 4,579,516 A | 4/1986 | Caputo | |
| 6,209,286 B1 * | 4/2001 | Perkins | B65D 81/052 53/553 |
| 6,800,162 B2 | 10/2004 | Kannankeril et al. | |
| 6,982,113 B2 | 1/2006 | Kannankeril et al. | |
| 7,018,495 B2 | 3/2006 | Kannankeril et al. | |
| 7,165,375 B2 | 1/2007 | O'Dowd | |
| 7,174,696 B2 * | 2/2007 | Perkins | B29C 65/222 53/403 |
| 7,220,476 B2 | 5/2007 | Sperry et al. | |
| 7,223,461 B2 | 5/2007 | Kannankeril et al. | |
| 7,429,304 B2 | 9/2008 | McNamara et al. | |
| 7,721,781 B2 | 5/2010 | Sperry et al. | |
| 7,950,433 B2 | 5/2011 | Sperry et al. | |
| 9,764,862 B2 * | 9/2017 | Borgeat | B65B 1/04 |
| 9,969,136 B2 | 5/2018 | Lepine et al. | |
| 10,286,617 B2 | 5/2019 | Murch et al. | |
| 10,837,432 B1 * | 11/2020 | Kaminski | F04B 39/12 |
| 2007/0251190 A1 | 11/2007 | Daigle et al. | |

OTHER PUBLICATIONS

Neel Rao, Centrifugal Fans in Series or Parallel Operation, Jan. 25, 2017, available at https://www.slideshare.net/NeelRao/centrifugal-fans-in-series-or-parallel-operation.

Sunon Technology, downloaded from http://www.sunon.com/uFiles/file/03_products/07-Technology/006.pdf on Oct. 7, 2019.

Series or parallel pump operation, Mc Nally Institute, as captured by the Wayback Machine on Dec. 17, 2019 and available for download at https://web.archive.org/web/20191217114800/http://www.mcnallyinstitute.com:80/18- html/1-1.htm.

* cited by examiner

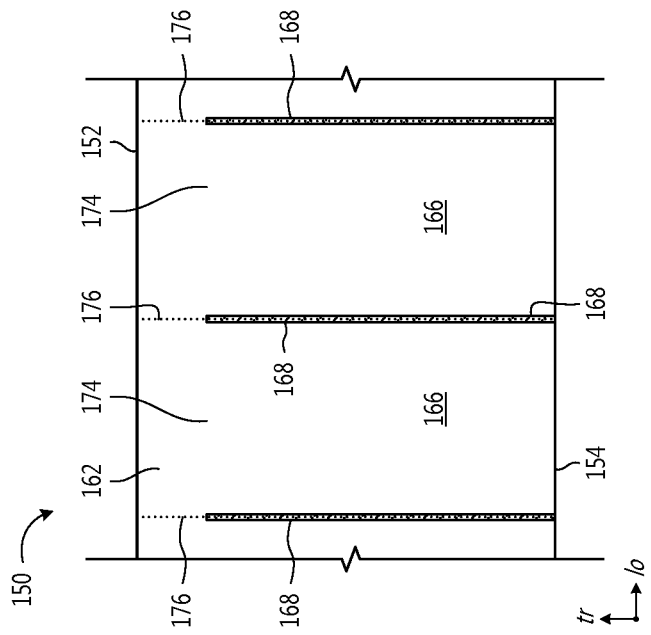
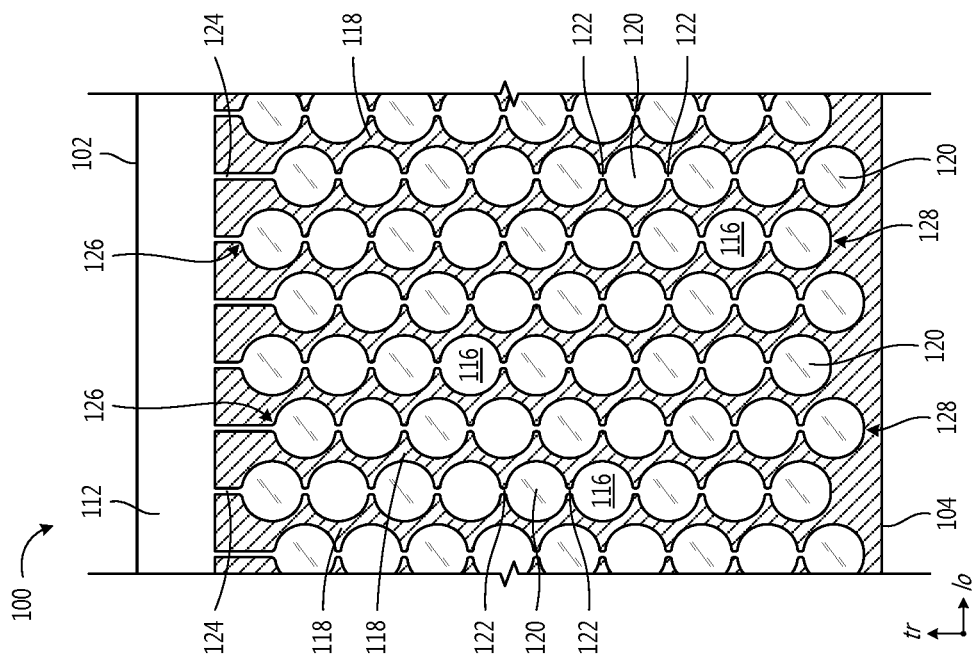
Fig. 1B
Fig. 1A

INFLATORS FOR INFLATABLE WEBS WITH GAS MOVING DEVICES IN SERIES

BACKGROUND

The present disclosure is in the technical field of inflators for inflatable webs. More particularly, the present disclosure is directed to inflators that include multiple gas moving devices that are in series with each other.

Inflated material or structures such as cushions or sheets can be used to package items, by wrapping the items in the material and placing the wrapped items in a shipping carton, or simply placing inflated material inside of a shipping carton along with an item to be shipped. The inflated material protects the packaged item by absorbing impacts that may otherwise be fully transmitted to the packaged item during transit, and may also restrict movement of the packaged item within the carton to further reduce the likelihood of damage to the item.

Systems and machines for manufacturing inflated material at relatively high speeds from an inflatable web would benefit from better alignment, tracking, and tension control of the inflatable web as it moves through the machine. This can help to reduce one or more of the noise associated with inflation of the web, improve efficient use of the inflation gas, increase inflation pressure efficiency, reduce wear on the machine parts, reduce down-time, and avoid poorly-inflated, non-inflated, and/or poorly-sealed inflated material, which may result in web wastage and/or premature deflation or other failure in protecting a packaged product. Accordingly, there remains a need in the art for improvements to systems for inflating inflatable webs in the protective packaging field.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In a first embodiment, an inflator for inflation of inflatable webs includes a web supply holding device configured to hold a supply of an inflatable web, a first gas moving device, a second gas moving device, and a nozzle. The first gas moving device has a first inlet and a first outlet and the second gas moving device has a second inlet and a second outlet. The first gas moving device is configured to receive gas via the first inlet and expel gas via the first outlet and the second gas moving device is configured to receive gas via the second inlet and expel gas via the second outlet. The first outlet is coupled to the second inlet such that gas expelled from the first outlet is received by the second inlet. The nozzle is coupled to the second outlet. The nozzle is configured to insert gas expelled from the second outlet into chambers of the inflatable web to inflate the inflatable web. Parameters of the first and second gas moving devices are selected based on a type of the inflatable web.

In a second embodiment, the parameters of the first and second gas moving devices of the first embodiment comprise a pressure setting of the first gas moving device.

In a third embodiment, the parameters of the second gas moving device of the second embodiment further comprise one or both of a flow rate setting of the second gas moving device or a pressure of the second gas moving device.

In a fourth embodiment, the inflator of any of the preceding embodiments further comprises a computing device configured to control the parameters of the first and second gas moving devices.

In a fifth embodiment, the computing device of the fourth embodiment is configured to identify the type of the inflatable web before controlling the parameters of the first and second gas moving devices.

In a sixth embodiment, the computing device of the fifth embodiment is configured to independently adjust the parameters of the first and second gas moving devices between a set of parameters for an inflatable cushioning material and a set of parameters for an inflatable void fill material.

In a seventh embodiment, the inflator of any of the fifth or sixth embodiments further includes a device communicatively coupled to the computing device and configured to receive information about the type of the inflatable web and to communicate the information about the type of the inflatable web to the computing device.

In an eighth embodiment, the device of the seventh embodiment includes a radio frequency identification (RFID) receiver configured to receive the information about the type of the inflatable web from an RFID tag coupled to the supply of the inflatable web.

In a ninth embodiment, the device of any of the seventh and eighth embodiments includes a user interface configured to receive an input from a user indicative of the information about the type of the inflatable web.

In a tenth embodiment, the device of any of the seventh to ninth embodiments includes a scanner configured to scan a code on the supply of the inflatable web, wherein the information about the type of the inflatable web is encoded in the code.

In an eleventh embodiment, the inflator of any of the fifth to tenth embodiments further includes a seal system configured to form a seal in the inflatable web to close the chambers and an actuator configured to drive the seal system. The seal system is configured to feed the inflatable web when driven by the actuator.

In a twelfth embodiment, the computing device of the eleventh embodiment is configured to control the actuator based on a feed rate for the type of the inflatable web.

In a thirteenth embodiment, the inflator of any of the fifth to twelfth embodiments further comprises a pressure sensor positioned between the second outlet and the nozzle. The pressure sensor is configured to detect pressure in the gas expelled via the second outlet.

In a fourteenth embodiment, the parameters of the first and second gas moving devices of the thirteenth embodiment include a pressure for inflation of the inflatable web. The computing device is configured to control one of the first and second gas moving devices based on the pressure detected by the pressure sensor and the pressure for inflation of the inflatable web.

In a fifteenth embodiment, the inflator of any of the fifth to fourteenth embodiments further includes a flow rate sensor positioned between the second outlet and the nozzle. The flow rate sensor is configured to detect a flow rate in the gas expelled via the second outlet.

In a sixteenth embodiment, the parameters of the first and second gas moving devices of the fifteenth embodiment include a flow rate for inflation of the inflatable web. The computing device is configured to control one of the first and second gas moving devices based on the flow rate detected by the flow rate sensor and the flow rate for inflation of the inflatable web.

In a seventeenth embodiment, the inflator of any of the fifth to sixteenth embodiments further comprises a first pressure sensor positioned between the first outlet and the second inlet, a first flow rate sensor positioned between the first outlet and the second inlet, a second pressure sensor positioned between the second outlet and the nozzle, and a second flow rate sensor positioned between the second outlet and the nozzle. The first pressure sensor is configured to detect pressure in the gas expelled via the first outlet. The first flow rate sensor is configured to detect a flow rate in the gas expelled via the first outlet. The second pressure sensor is configured to detect pressure in the gas expelled via the second outlet. The second flow rate sensor is configured to detect a flow rate in the gas expelled via the second outlet.

In an eighteenth embodiment, the inflator of the seventeenth embodiment further comprises a computing device configured to independently calibrate the first and second gas moving devices. Calibration of the first gas moving device is based on the pressure measured by the first pressure sensor and the flow rate measured by the first flow rate sensor. Calibration of the second gas moving device is based on the pressure measured by the second pressure sensor and the flow rate measured by the second flow rate sensor.

In a nineteenth embodiment, each of the first and second gas moving devices of any of the preceding embodiments is one of a fan, a blower, or a compressor.

In a twentieth embodiment, each of the first and second gas moving devices of any of the preceding embodiments is a blower.

BRIEF DESCRIPTION OF THE DRAWING

The foregoing aspects and many of the attendant advantages of the disclosed subject matter will become more readily appreciated as the same become better understood by reference to the following detailed description, when taken in conjunction with the accompanying drawings, wherein:

FIG. 1A depicts a front view of an embodiment of an inflatable web, in accordance with the embodiments described herein;

FIG. 1B depicts a front view of another embodiment of an inflatable web, in accordance with the embodiments described herein;

DETAILED DESCRIPTION

Figure 2:
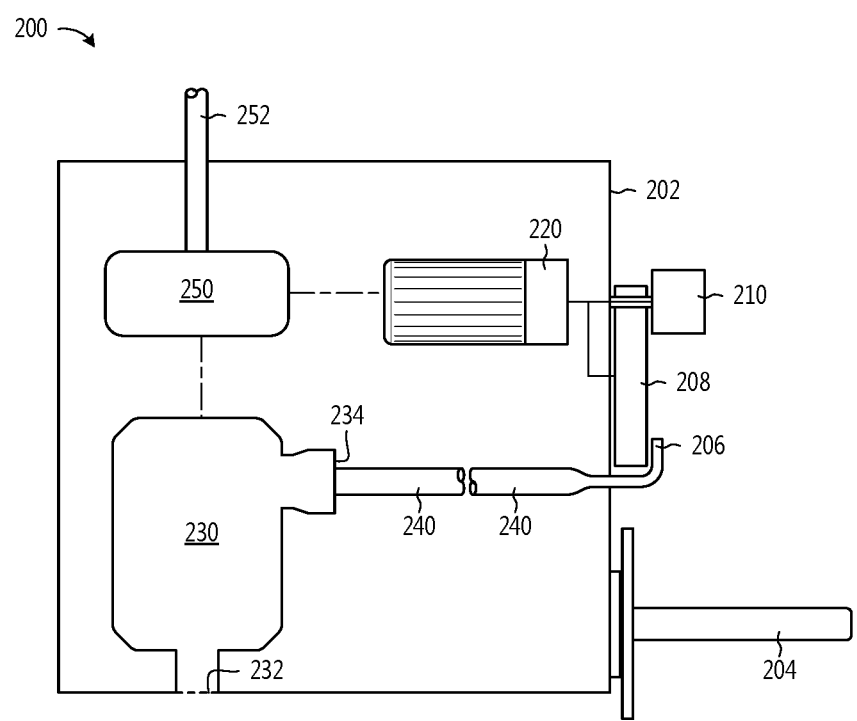
FIG. 2 depicts a schematic view of an embodiment of an inflator configured to inflate inflatable webs, in accordance with the embodiments described herein.

As used herein, the term "air cellular material" includes air-filled containers that can be used as cushioning and/or void fill material. For example, as used herein, air cellular material can refer to inflatable cushioning material, such as BUBBLE WRAP® air cushioning material sold by Sealed Air Corporation, where a first film or laminate is formed (e.g., thermoformed, embossed, calendarexd, or otherwise processed) to define a plurality of cavities and a second film or laminate is adhered to the first film or laminate in order to close the cavities. For example, as used herein, air cellular material can refer to inflatable cushioning material, such as BUBBLE WRAP® IB air cushioning material sold by Sealed Air Corporation, or inflatable void fill material, such as FILL-AIR® air pillows sold by Sealed Air Corporation. In any of these examples, an inflatable web can be inflated and sealed to form the air cellular material. Examples of air cellular materials are shown in U.S. Pat. Nos. 3,142,599, 3,208,898, 3,285,793, 3,508,992, 3,586,565, 3,616,155, 3,660,189, 4,181,548, 4,184,904, 4,415,398, 4,576,669, 4,579,516, 6,800,162, 6,982,113, 7,018,495, 7,165,375, 7,220,476, 7,223,461, 7,429,304, 7,721,781, 7,950,433, 9,969,136 and 10,286,617, the disclosures of which are hereby incorporated by reference in their entirety.

FIG. 1A depicts a front view of an embodiment of an inflatable web 100. The inflatable web 100 includes two juxtaposed sheets that are arranged such that the inflatable web 100 includes a longitudinal edge 102 and a longitudinal edge 104. Inner surfaces of the two sheets are sealed to each other in a pattern that defines a series of chambers 116. In some embodiments, seals between the two sheets include seals 118 that define the chambers 116. In the depicted embodiment, the chambers 116 are shaped to have a series of cells 120 and passageways 122. In some embodiments, the cells 120 have a larger width than the passageways 122. In the depicted embodiment, the cells 120 have a generally circular shape such that, after the cells 120 are inflated, the cells 120 would have a three-dimensional "bubble" shape. In other embodiments, the cells 120 may have other shapes, such as rectangular shapes, hexagonal shapes, and the like. In the depicted embodiment, adjacent ones of the chambers 116 are offset from each other so that the cells 120 of one chamber are aligned with the passageways 122 of an adjacent chamber to enable the chambers 116 to be arranged in close proximity to each other.

In general, any of the sheets described herein may comprise any flexible material that can be manipulated to enclose a gas in inflatable chambers as herein described, including various thermoplastic materials, e.g., polyethylene homopolymer or copolymer, polypropylene homopolymer or copolymer, etc. Non-limiting examples of suitable thermoplastic polymers include polyethylene homopolymers, such as low density polyethylene (LDPE) and high density polyethylene (HDPE), and polyethylene copolymers such as, e.g., ionomers, EVA, EMA, heterogeneous (Zeigler-Natta catalyzed) ethylene/alpha-olefin copolymers, and homogeneous (metallocene, single-cite catalyzed) ethylene/alpha-olefin copolymers. Ethylene/alpha-olefin copolymers are copolymers of ethylene with one or more comonomers selected from C3 to C20 alpha-olefins, such as 1-butene, 1-pentene, 1-hexene, 1-octene, methyl pentene and the like, in which the polymer molecules comprise long chains with relatively few side chain branches, including linear low density polyethylene (LLDPE), linear medium density polyethylene (LMDPE), very low density polyethylene (VLDPE), and ultra-low density polyethylene (ULDPE). Various other materials are also suitable such as, e.g., polypropylene homopolymer or polypropylene copolymer (e.g., propylene/ethylene copolymer), polyesters, polystyrenes, polyamides, polycarbonates, etc. The film may be monolayer or multilayer and can be made by any known coextrusion process by melting the component polymer(s) and extruding or coextruding them through one or more flat or annular dies.

In some embodiments, the seals 118 also define ports 124. Each of the ports 124 permits fluid, such as gas (e.g., air), to pass from an inflation channel 112 into one of the chambers 116. The ports 124 pass through the seals 118 to permit gas to pass from the inflation channel 112 into the chambers 116. In some embodiments, the inflation channel 112 is "open" because the two sheets are not connected at the longitudinal edge 102. When the inflation channel 112 is open, the inflation channel 112 can be positioned such that, as the inflatable web 100 is fed, a nozzle passes through the inflation channel 112 between the two sheets. In some embodiments, the inflation channel 112 is "closed" because the two sheets are connected at the longitudinal edge 102. When the inflation channel 112 is closed, the inflation channel 112 can be positioned such that, as the inflatable web 100 is fed, a nozzle is inserted into the inflation channel 112 between the two sheets and then the inflation channel 112 is slit open to permit the two sheets to pass on other side of the nozzle. Whether the inflation channel 112 is open or closed, the nozzle can inflate the chambers 116 inserting air into the inflation channel 112 that passes through the ports 124 and into the chambers 116.

In some embodiments, the chambers 116 extend in a transverse direction between the two longitudinal edges 102 and 104. In the depictions shown herein, the transverse directions on inflatable webs and inflated webs are generally indicated by the arrow tr and the longitudinal directions on inflatable webs and inflated webs are generally indicated by the arrow lo. Generally, the longitudinal direction of an inflatable web is substantially parallel to the longitudinal edges 102 and 104 and the transverse direction of the inflatable web is substantially perpendicular to the longitudinal direction. In the depicted embodiment, the chambers 116 have proximal ends 126 and distal ends 128. The proximal ends 126 are the end of the chambers 116 that is closest to the longitudinal edge 102 and/or closest to the inflation channel 112. The distal ends 128 are the end of the chambers 116 that are closest to the longitudinal edge 104. In the depicted embodiment, the distal ends 128 of the chambers 116 are closed. In other embodiments, the distal ends 128 may be in fluid communication with another inflation chamber located along the longitudinal edge 104.

FIG. 1B depicts a front view of another embodiment of an inflatable web 150. The inflatable web 150 includes two juxtaposed sheets that are arranged such that the inflatable web 150 includes a longitudinal edge 152 and a longitudinal edge 154. Inner surfaces of the two sheets are sealed to each other in a pattern that defines a series of chambers 166. In some embodiments, seals between the two sheets include seals 168 that define the chambers 166. In the depicted embodiment, the chambers 166 are generally rectangular in shape. In other embodiments, the chambers 166 may have other shapes, such as hexagonal shapes, round shapes, irregular shapes, and the like. In the depicted embodiment, the inflatable web 150 includes lines of weakness 176 between the chambers 166. The lines of weakness 176 are configured to allow a user to more easily separate the chambers 166 from each other after the chambers 166 are inflated. In some embodiments, each of the lines of weakness 176 include a perforation, a score, a slit, a cut, a series of hold, any other feature that increases the ability of a user to separate the chambers 166 from each other, or any combination thereof.

In some embodiments, the seals 168 also define ports 174. Each of the ports 174 permits fluid, such as gas (e.g., air), to pass from an inflation channel 162 into one of the chambers 166. The ports 174 pass between the seals 168 to permit gas to pass from the inflation channel 162 into the chambers 166. In the depicted embodiment, the ports 174 are significantly longer than the ports 124 of the inflatable web 100. In the depicted embodiment, the inflation channel 162 is an open inflation channel. In other embodiments, the inflation channel 162 can be a closed inflation channel.

Depicted in FIG. 2 is a schematic view of an embodiment of an inflator 200 configured to inflate inflatable webs. The inflator 200 includes a housing 202. The housing may be formed from a rigid or a semi-rigid material, such as one or more of a metal material, a rigid plastic material, any other rigid or a semi-rigid material, or any combination thereof. In some embodiments, the housing 202 is a part of a support structure configured to hold components of the inflator 200. In some embodiments, the housing 202 is configured to house some of the components of the inflator 200 and/or provide protection for users of the inflator 200 (e.g., a physical barrier from moving parts, electrical insulation from powered components, etc.).

The inflator 200 includes a web supply holding device 204 configured to hold a supply of an inflatable web. In the depicted embodiment, the web supply holding device 204 is a spindle configured to hold a roll of an inflatable web (e.g., a roll of the inflatable web 100 or a roll of the inflatable web 150). In other embodiments, the web supply holding device 204 can hold other types of supplies of inflatable web, such as a dispenser configured to hold a supply of inflatable web in the form of a fanfolded stack of the inflatable web. In the depicted embodiment, the web supply holding device 204 extends from the housing 202 of the inflator 200. In some embodiments, the web supply holding device 204 is a spindle fixedly coupled to the housing 202 and the roll of the inflatable web is configured to rotate with respect to the spindle. In other embodiments, the spindle is rotatably coupled to the housing 202 so that the web supply holding device 204 is a spindle configured to rotate with respect to the housing 202 so that the spindle and the roll of the inflatable web rotate together.

The inflator 200 further includes a nozzle 206 configured to inflate the inflatable web. In the depicted embodiment, the nozzle 206 extends from the housing 202. The nozzle 206 is configured to inflate chambers of an inflatable web. In some embodiments, the nozzle 206 is configured to insert gas into an inflation channel of the inflatable web, which is in fluid communication with the chambers such that the gas inserted into the inflation channel passes into the chambers.

The inflator 200 also includes an engagement system 208 configured to hold the inflation channel of an inflatable web closed downstream of the nozzle 206 until the chambers are sealed. Holding the inflation channel closed deters gas from escaping the inflation channel and deters gas from escaping the chambers so that the chambers remain inflated until they are sealed. In some embodiments, the engagement system 208 includes a number of engagement rollers that hold the ends of the inflation channel closed. In other embodiments, the engagement system 208 can include sprockets, belts, bearings, and/or any other device capable of holding closed the ends of the inflation channel.

The inflator 200 further includes a seal system 210 configured to form a seal across the ports of the chambers of the inflatable web. In some embodiments, the seal system 210 is configured to form a heat seal in the inflatable web. In some embodiments, the seal system 210 includes rollers that form a nip through which the inflatable web passes. One of the rollers can include a heating element that passes around the circumference of the roller. The heating element is configured to heat the inflatable web as the inflatable web passes through the nip between the rollers. The other roller serves as a backing for the heating element. In other embodiments, the seal system 210 can include a heating wire, a heating block, a drag sealer, or any other mechanism configured to form a seal in the inflatable web.

The inflator 200 further includes an actuator 220 located inside of the housing 202. The actuator 220 is configured to drive one or both of the engagement system 208 or the seal system 210. When driven, the engagement system 208 and/or the seal system 210 is configured to pull the inflatable web from the supply on the web supply holding device 204, past the nozzle 206, and through the engagement system 208 and the seal system 210. In some embodiments, the actuator 220 includes at least one of an electrical actuator (e.g., an electric motor), a hydraulic actuator, a pneumatic actuator, a mechanical actuator, or any other type of actuator.

The inflator 200 further includes a gas moving device 230. The gas moving device 230 includes an inlet 232 and an outlet 234. The gas moving device 230 is configured to receive gas (e.g., air) via the inlet 232 and expel gas via the outlet 234. In the depicted embodiment, the inlet 232 is positioned to receive gas from the ambient environment outside of the housing 202. The gas moving device 230 is further configured to increase the pressure and/or the flow rate of the gas between the inlet 232 and the outlet 234. The gas moving device 230 can be defined by its pressure ratio, which is the ratio of the outlet pressure ($P_{outlet}$) to the outlet pressure ($P_{inlet}$). In some embodiments, the gas moving device 230 is a fan (e.g., having a pressure ratio less than or equal to 1.11), a blower (e.g., having a pressure ratio between 1.11 and 1.2), or a compressor (e.g., having a pressure ratio greater than 1.2). The inflator 200 also includes a gas line 240 between the outlet 234 of the gas moving device 230 and the nozzle 206 so that the gas expelled from the gas moving device 230 is carried to the nozzle 206 for inflation of the inflatable web.

The inflator 200 further includes a power supply 250. The power supply is configured to receive source electrical current and provide proper electrical current for the components within the inflator 200. In the depicted embodiment, the power supply 250 is configured to receive source electrical current via a power cord 252, such as a cord that can be electrically coupled to a wall electrical outlet in a building. The power supply 250 is electrically coupled to each of the actuator 220 and the gas moving device 230 and configured to provide electrical current to each of the actuator 220 and the gas moving device 230. In some embodiments, the operation of the inflator 200 is controlled by controlling operation of the power supply 250. For example, when the inflator 200 is turned "on", the power supply 250 is controlled to provide power to the actuator 220 and to the gas moving device 230 so that the inflatable web is advanced and inflated. Similarly, when the inflator 200 is turned "off", the power supply 250 is configured not to provide power to the actuator 220 and the gas moving device 230. In other embodiments, the power supply 250 can be electrically coupled to any other component of the inflator 200 (e.g., a heating element of the seal system 210) that is powered.

Existing inflators for inflatable webs have a design similar to the inflator 200 depicted in FIG. 2. The inflator 200 can successfully inflate and seal inflatable webs. However, most existing inflators are designed to inflate a particular type of inflatable webs. Different types of inflatable webs have different inflation parameters. For example, inflatable cushioning material (e.g., inflatable web 100) typically inflates using gas at a higher pressure and lower flow rate than the gas used to inflate inflatable void fill material (e.g., inflatable web 150). Most gas moving devices (e.g., gas moving device 230) can be calibrated to control the output pressure or the gas flow rate at the outlet, but not both. Thus, in the case of the inflator 200, the gas moving device 230 can be selected to provide appropriate pressure and flow rate for inflation of inflatable cushioning materials or appropriate pressure and flow rate for inflation of inflatable void fill materials, but not both. Some gas moving devices that allow for independent calibration of pressure and flow rate; however, these pressure-and-flow-rate-controllable gas moving devices are typically much to expensive for inflators to be commercially successful. It would be advantageous to have an inflator that inflate many types of inflatable webs without the significant cost of pressure-and-flow-rate-controllable gas moving devices.

Figure 3A:
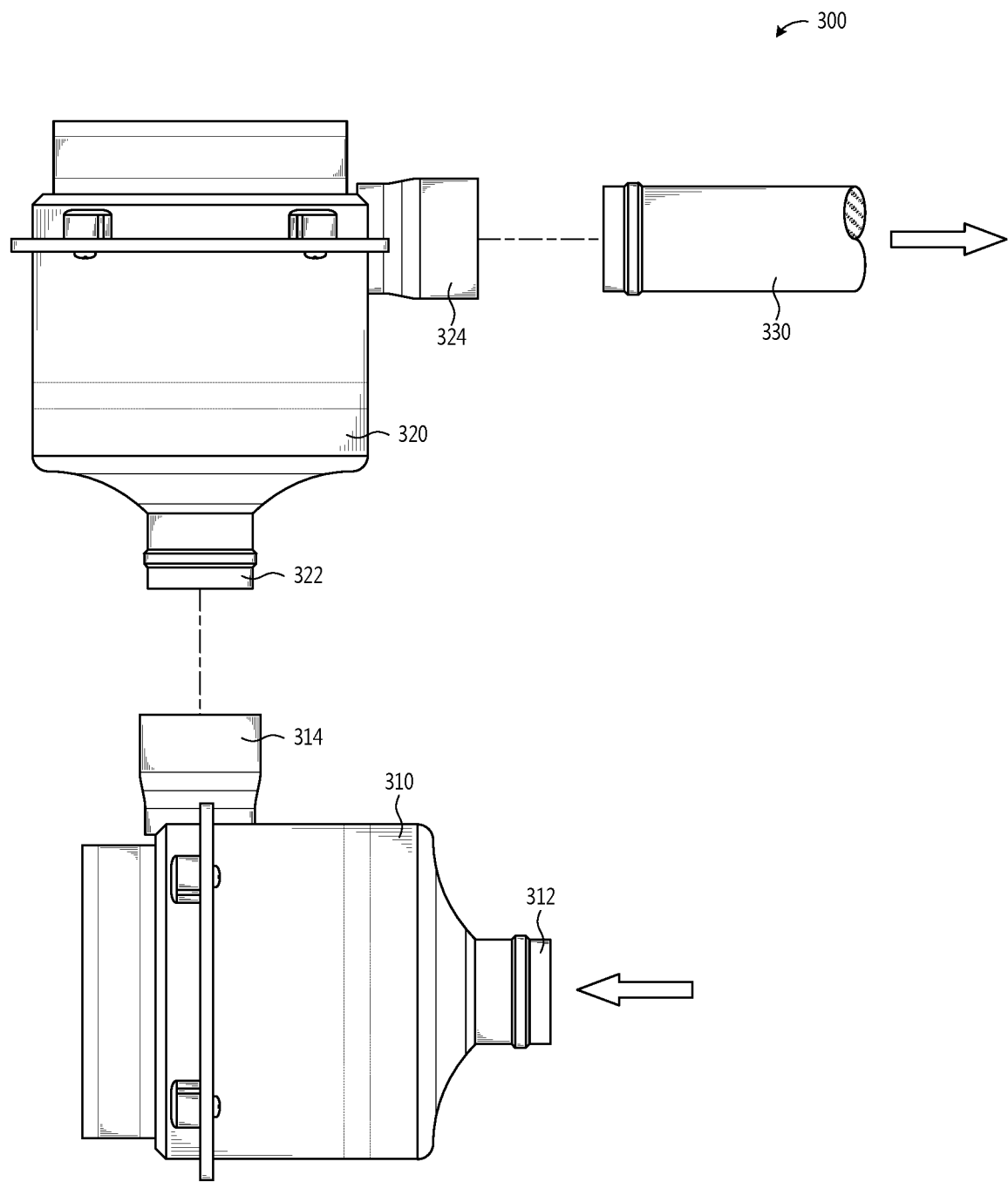
FIGS. 3A and 3B depict exploded and assembled views, respectively, of an embodiment of a system that includes multiple gas moving devices positioned in series with each other, in accordance with the embodiments described herein.
Figure 3B:
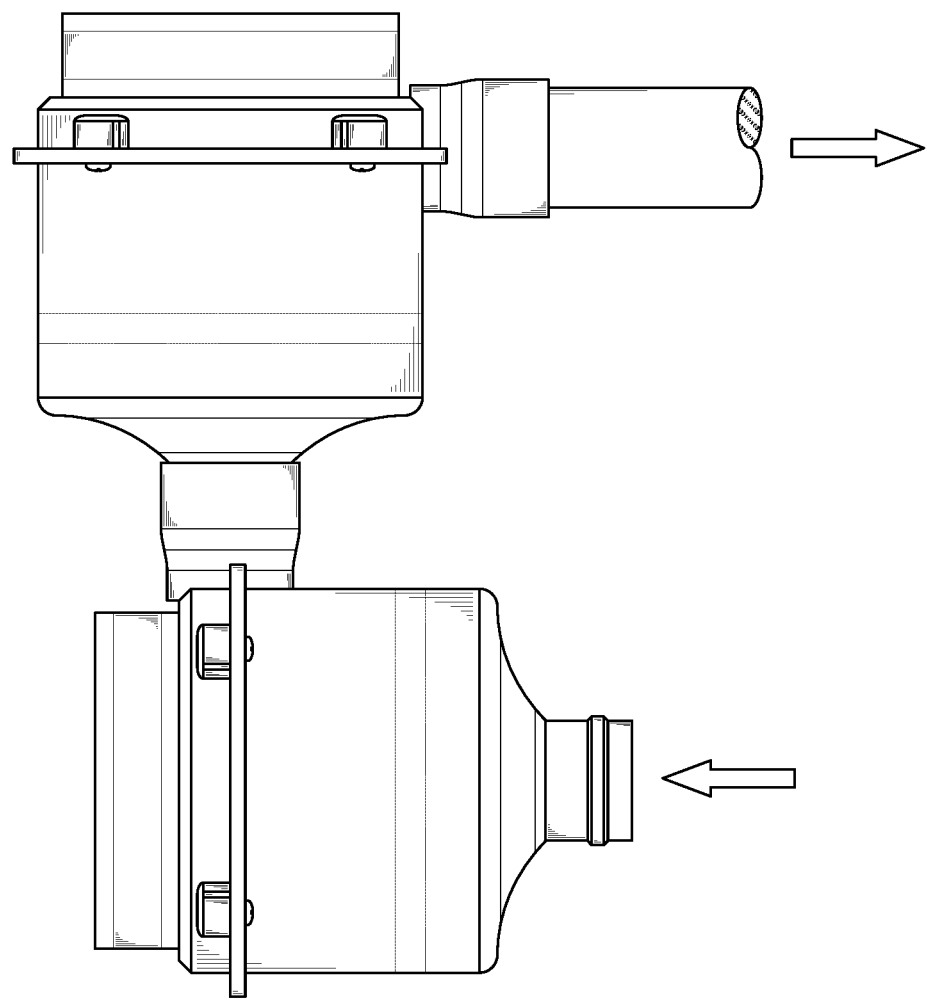

In embodiments described herein, inflators include multiple gas moving devices positioned in series with each other. Depicted in FIGS. 3A and 3B are exploded and assembled views, respectively, of an embodiment of a system 300 including multiple gas moving devices positioned in series with each other. The system 300 includes a gas moving device 310 and a gas moving device 320. In the depicted embodiment, the gas moving devices 310 and 320 are blowers. In other embodiments, the gas moving devices 310 and 320 can include a fan, a blower, a compressor, or any combination thereof.

In the system 300, the gas moving device 310 includes an inlet 312 and an outlet 314. The gas moving device 320 includes an inlet 322 and an outlet 324. The outlet 314 of the gas moving device 310 is coupled to the inlet 322 of the gas moving device 320 such that the gas expelled from the gas moving device 310 enters the gas moving device 320. In the depicted embodiment, the outlet 314 of the gas moving device 310 is coupled directly to the inlet 322 of the gas moving device 320. In other embodiments, the outlet 314 of the gas moving device 310 can be coupled indirectly (e.g., via a gas line) to the inlet 322 of the gas moving device 320. The system 300 further includes a gas line 330 coupled to the outlet 324 of the gas moving device 320. The gas line 330 is configured to carry gas expelled from the gas moving device 320. For example, the gas line 330 can carry gas expelled from the gas moving device 320 to the nozzle of an inflator.

In the system 300, one of the gas moving devices 310 and 320 can be configured to control the pressure of the gas and the other of the gas drive devices 310 and 320 can be configured to control the flow rate of the gas. For example, the gas moving device 310 can be configured to raise the pressure of the gas to a particular level and the gas moving device 320 can be configured to raise the flow rate of the gas to a particular level. In this way, the system 300 can provide for control of both the pressure and flow rate of the gas that is expelled from the gas moving device 320 into the gas line 330. The cost of having two gas moving devices is double the cost of having just one gas moving device, but the cost of having two gas moving devices is significantly less than the cost of a single pressure-and-flow-rate-controllable gas moving device.

Figure 4A:
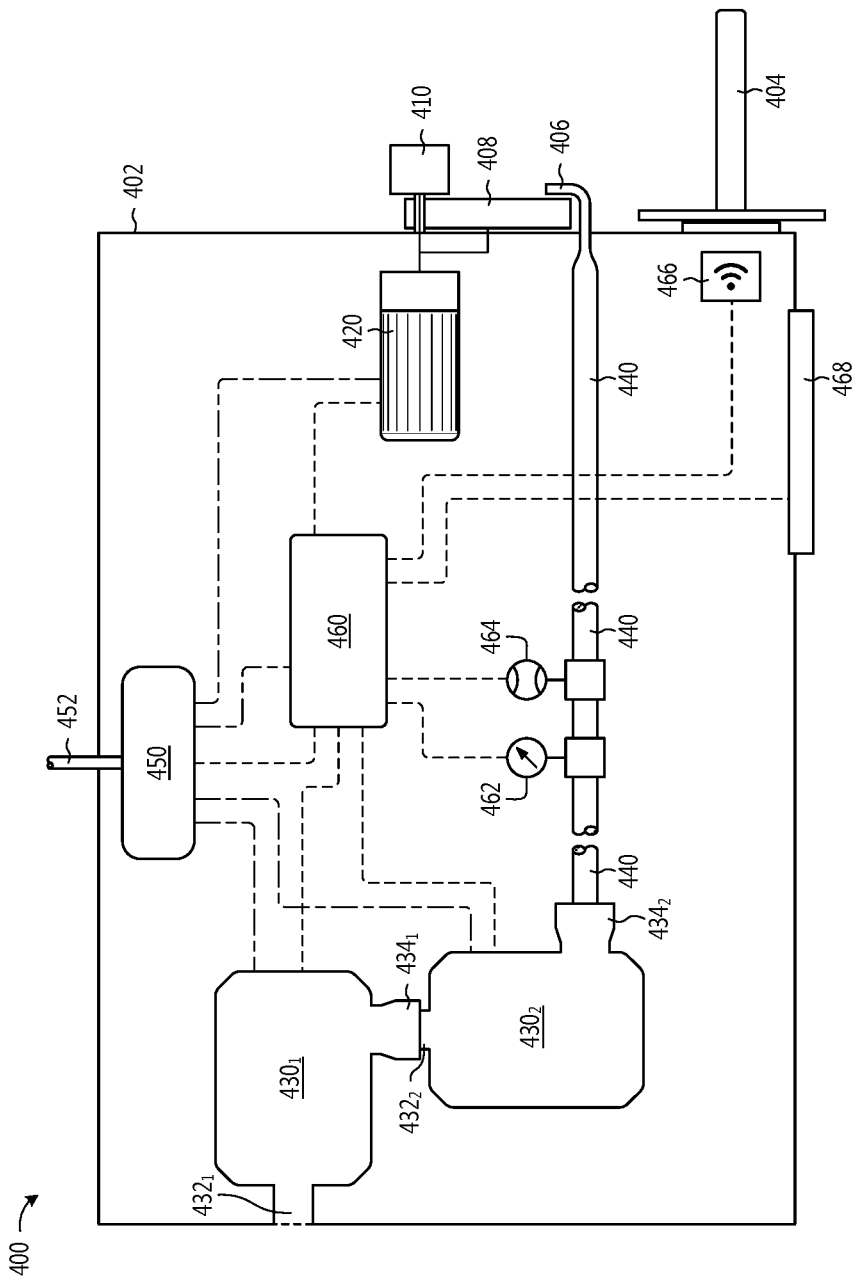
FIGS. 4A and 4B depict schematic views of embodiments of inflators that are configured to inflate inflatable webs and have multiple gas moving devices in series with each other, in accordance with the embodiments described herein.

Depicted in FIG. 4A is a schematic view of an embodiment of an inflator 400 that is configured to inflate inflatable webs and has multiple gas moving devices in series with each other. The inflator 400 includes a housing 402. The housing may be formed from a rigid or a semi-rigid material, such as one or more of a metal material, a rigid plastic material, any other rigid or a semi-rigid material, or any combination thereof. In some embodiments, the housing 402 is a part of a support structure configured to hold components of the inflator 400. In some embodiments, the housing 402 is configured to house some of the components of the inflator 400 and/or provide protection for users of the inflator 400 (e.g., a physical barrier from moving parts, electrical insulation from powered components, etc.).

The inflator 400 includes a web supply holding device 404 configured to hold a supply of an inflatable web. In the depicted embodiment, the web supply holding device 404 is a spindle configured to hold a roll of an inflatable web (e.g., a roll of the inflatable web 100 or a roll of the inflatable web 150). In other embodiments, the web supply holding device 404 can hold other types of supplies of inflatable web, such as a dispenser configured to hold a supply of inflatable web in the form of a fanfolded stack of the inflatable web. In the depicted embodiment, the web supply holding device 404 extends from the housing 402 of the inflator 400. In some embodiments, the web supply holding device 404 is a spindle fixedly coupled to the housing 402 and the roll of the inflatable web is configured to rotate with respect to the spindle. In other embodiments, the spindle is rotatably coupled to the housing 402 so that the web supply holding device 404 is a spindle configured to rotate with respect to the housing 402 so that the spindle and the roll of the inflatable web rotate together.

The inflator 400 further includes a nozzle 406 configured to inflate the inflatable web. In the depicted embodiment, the nozzle 406 extends from the housing 402. The nozzle 406 is configured to inflate chambers of an inflatable web. In some embodiments, the nozzle 406 is configured to insert gas into an inflation channel of the inflatable web, which is in fluid communication with the chambers such that the gas inserted into the inflation channel passes into the chambers.

The inflator 400 also includes an engagement system 408 configured to hold the inflation channel of an inflatable web closed downstream of the nozzle 406 until the chambers are sealed. Holding the inflation channel closed deters gas from escaping the inflation channel and deters gas from escaping the chambers so that the chambers remain inflated until they are sealed. In some embodiments, the engagement system 408 includes a number of engagement rollers that hold the ends of the inflation channel closed. In other embodiments, the engagement system 408 can include sprockets, belts, bearings, and/or any other device capable of holding closed the ends of the inflation channel.

The inflator 400 further includes a seal system 410 configured to form a seal across the ports of the chambers of the inflatable web. In some embodiments, the seal system 410 is configured to form a heat seal in the inflatable web. In some embodiments, the seal system 410 includes rollers that form a nip through which the inflatable web passes. One of the rollers can include a heating element that passes around the circumference of the roller. The heating element is configured to heat the inflatable web as the inflatable web passes through the nip between the rollers. The other roller serves as a backing for the heating element. In other embodiments, the seal system 410 can include a heating wire, a heating block, a drag sealer, or any other mechanism configured to form a seal in the inflatable web.

The inflator 400 further includes an actuator 420 located inside of the housing 402. The actuator 420 is configured to drive one or both of the engagement system 408 or the seal system 410. When driven, the engagement system 408 and/or the seal system 410 is configured to pull the inflatable web from the supply on the web supply holding device 404, past the nozzle 406, and through the engagement system 408 and the seal system 410. In some embodiments, the actuator 420 includes at least one of an electrical actuator (e.g., an electric motor), a hydraulic actuator, a pneumatic actuator, a mechanical actuator, or any other type of actuator.

The inflator 400 further includes a gas moving device $430_1$ and a gas moving device $430_2$. The gas moving device $430_1$ includes an inlet $432_1$ and an outlet $434_1$ and the gas moving device $430_2$ includes an inlet $432_2$ and an outlet $434_2$. The gas moving device $430_1$ is configured to receive gas (e.g., air) via the inlet $432_1$ and expel gas via the outlet $434_1$ and the gas moving device $430_2$ is configured to receive gas (e.g., air) via the inlet $432_2$ and expel gas via the outlet $434_2$. In the depicted embodiment, the inlet $432_1$ of the gas moving device $430_1$ is positioned to receive gas from the ambient environment outside of the housing 402. The outlet $434_1$ of the gas moving device $430_1$ is coupled to the inlet $432_2$ of the gas moving device $430_2$ so that the inlet $432_2$ of the gas moving device $430_2$ is positioned to receive gas expelled from the outlet $434_1$ of the gas moving device $430_1$. The inflator 400 also includes a gas line 440 between the outlet $434_2$ of the gas moving device $430_2$ and the nozzle 406 so that the gas expelled from the gas moving device $430_2$ is carried to the nozzle 406 for inflation of the inflatable web.

The gas moving devices $430_1$ and $430_2$ are further configured to increase the pressure and the flow rate of the gas between the inlet $432_1$ of the gas moving device $430_1$ and the outlet $434_2$ of the gas moving device $430_2$. The gas moving devices $430_1$ and $430_2$ can be defined by their pressure ratios ($P_{outlet}/P_{inlet}$). In some embodiments, each of the gas moving devices $430_1$ and $430_2$ is a fan (e.g., having a pressure ratio less than or equal to 1.11), a blower (e.g., having a pressure ratio between 1.11 and 1.2), or a compressor (e.g., having a pressure ratio greater than 1.2). In some embodiments, one of the gas moving devices $430_1$ and $430_2$ is configured to raise a pressure of the gas between its inlet $432_1$ or $432_2$ and its outlet $434_1$ or $434_2$ and the other of the gas moving devices $430_1$ and $430_2$ is configured to control a flow rate of the gas between its inlet $432_1$ or $432_2$ and its outlet $434_1$ or $434_2$.

The inflator 400 further includes a power supply 450. The power supply is configured to receive source electrical current and provide proper electrical current for the components within the inflator 400. In the depicted embodiment, the power supply 450 is configured to receive source electrical current via a power cord 452, such as a cord that can be electrically coupled to a wall electrical outlet in a building. The power supply 450 is electrically coupled to each of the actuator 420, the gas moving device $430_1$, the gas moving device $430_2$, and a computing device 460. The power supply 450 is configured to provide electrical current to each of the actuator 420, the gas moving device $430_1$, the gas moving device $430_2$, and a computing device 460. In some embodiments, the operation of the inflator 400 is controlled by controlling operation of the power supply 450. For example, when the inflator 400 is turned "on", the power supply 450 is controlled to provide power to the actuator 420, the gas moving device $430_1$, and the gas moving device $430_2$ so that the inflatable web is advanced and inflated. Similarly, when the inflator 400 is turned "off", the power supply 450 is configured not to provide power to the actuator 420, the gas moving device $430_1$, and the gas moving device $430_2$. In other embodiments, the power supply 450 can be electrically coupled to any other component of the inflator 400 (e.g., a heating element of the seal system 410) that is powered.

In the depicted embodiment, the inflator further includes the computing device 460. In some embodiments, the computing device 460 is a controller, a programmable computer, a field programmable gate array, or any other type of computing device. The computing device 460 is electrically coupled to the power supply 450 and the power supply 250 is configured to power the computing device 460. In some embodiments, the computing device 460 is communicatively coupled to the gas moving devices $430_1$ and $430_2$. The computing device 460 is configured to control operation of the gas moving devices $430_1$ and $430_2$ (e.g., direct the outlet pressure and/or outlet flow rate from the gas moving devices $430_1$ and $430_2$). In some embodiments, the computing device 460 is configured to control operation of the gas moving devices $430_1$ and $430_2$ by controlling one or more of a target outlet pressure of one of the gas moving devices $430_1$ and $430_2$, a target outlet flow rate of one of the gas moving devices $430_1$ and $430_2$, an amount of power provided from the power supply 450 to one of the gas moving devices $430_1$ and $430_2$, or in any other way. In the depicted embodiment, the computing device 460 is communicatively coupled to the actuator 420. In some embodiments, the computing device 460 is configured to control operation of the actuator 420 (e.g., whether and at what speed the actuator 420 drives the engagement system 408 and/or the seal system 410). In some embodiments, the computing device 460 is configured to control operation of the actuator 420 by controlling one or more of a target speed of the actuator 420, a target torque of the actuator 420, an amount of power provided from the power supply 450 to the actuator 420, or in any other way.

In some embodiments, the inflator 400 includes a pressure sensor 462 and a flow rate sensor 464. In the depicted embodiment, the pressure sensor 462 and the flow rate sensor 464 are located on the gas line and are configured to detect the pressure and flow rate, respectively, of the gas in the gas line 440 (e.g., downstream of the gas moving devices $430_1$ and $430_2$). In the depicted embodiment, the computing device 460 is communicatively coupled to each of the pressure sensor 462 and the flow rate sensor 464. The computing device 460 can be configured to receive indications of the pressure and flow rate of the gas in the gas line 440 from the pressure sensor 462 and the flow rate sensor 464, respectively. In some embodiments, the computing device 460 can be configured to control one or both of the gas moving devices $430_1$ and $430_2$ based on one or both of the indications of the pressure and flow rate.

In some embodiments, it may be advantageous for the computing device 460 to automatically adjust the operation of the inflator 200 based on the type of the inflatable web loaded on the web supply holding device 404. For example, when a particular type of inflatable web is loaded on the web supply holding device 404, the computing device 460 may adjust the pressure and/or the flow rate of one or both of the gas moving devices $430_1$ and $430_2$, the speed of the actuator 420, the temperature of a heating element of the seal system 410, or any other aspect of the inflator 400. In some embodiments, where the type of inflatable web is an inflatable cushioning material, the computing device 460 may raise the pressure of the gas moving device $430_1$, lower the flow rate of the gas moving device $430_2$, and decrease the speed of the actuator 420. In some embodiments, where the type of inflatable web is void fill material, the computing device 460 may decrease the pressure of the gas moving device $430_1$, increase the flow rate of the gas moving device $430_2$, and increase the speed of the actuator 420. The computing device 460 can identify the type of the inflatable web loaded on the web supply holding device 404 in a number of ways.

In the depicted embodiment, the inflator 400 includes a wireless receiver 466 that is communicatively coupled to the computing device 460. In some embodiments, the wireless receiver 466 includes one or more of a near field communication (NFC) receiver, a radio frequency identification (RFID) receiver, a Bluetooth receiver, a Wi-Fi receiver, or any other type of wireless receiver. In some embodiments, the wireless receiver 466 can be a wireless transceiver. The wireless receiver 466 is configured to receive a wireless signal from a wireless transmitter or tag on the supply of the inflatable web loaded on the web supply holding device 404. For example, the wireless receiver 466 may include an RFID transceiver and the supply of inflatable web loaded on the web supply holding device 404 may include an RFID tag that contains an indication of the type of inflatable web that is transmitted from the RFID tag to the wireless receiver 466 in response to the supply of inflatable web being loaded on the web supply holding device 404. The information received by the wireless receiver 466 may include an identifier of the type of the inflatable web, an indication of inflation parameters for the inflatable web, a unique identifier for the specific roll of the inflatable web (e.g., a serial number), or any other information that can be used by the computing device 460 to determine the appropriate inflation parameters.

In the depicted embodiment, the inflator 400 also includes a user interface 468 that is communicatively coupled to the computing device 460. The user interface 468 may include one or more input or output devices that are capable of receiving inputs from a user and/or outputting outputs to a user. For example, the user interface 468 may include buttons, a display, a touchscreen display, or any other user input and/or output device. When a supply of inflatable web is loaded on the web supply holding device 404, a user may manually input information into the user interface 468 that can be used by the computing device 460 to properly adjust the inflator 400. For example, the information inputted by the user into the user interface 468 may include an identifier of the type of the inflatable web, an indication of inflation parameters for the inflatable web, a unique identifier for the specific roll of the inflatable web (e.g., a serial number), or any other information that can be used by the computing device 460 to determine the appropriate inflation parameters.

The inflator 400 may include any other device that can be used to receive information about the type of inflatable web and communicate the type of the inflatable web to the computing device 460. In some embodiments, the inflator includes a scanner (e.g., a barcode scanner, a camera, etc.) configured to scan a code (e.g., a barcode, a QR code, etc.) on the supply of the inflatable web that has the information about the type of inflatable web encoded therein. In some embodiments, the web supply holding device 404 may include electrical contacts that engage electrical contacts on the supply of the inflatable web when properly loaded on the web supply holding device 404 for communication of information about the type of the inflatable web. In some embodiments, the web supply holding device 404 may include mechanical buttons that are selectively depressed by a keyed component on the supply of the inflatable web, where the specific combination of buttons depressed indicates the type of the inflatable web. It will be apparent that any number of other devices can be used by the inflator 400 to receive information about the type of inflatable web to the computing device 460.

Figure 4B:
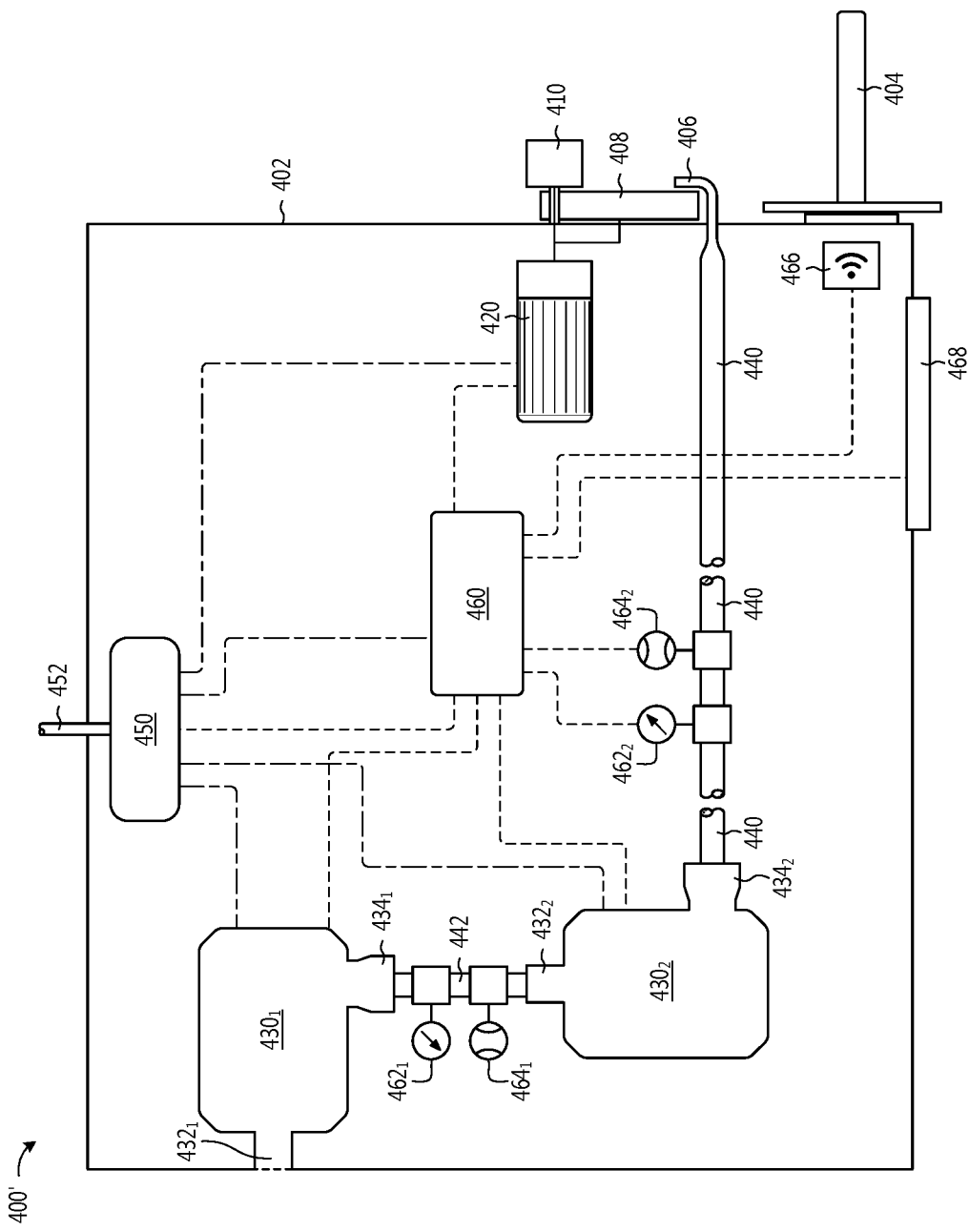

Depicted in FIG. 4B is a schematic view of an embodiment of an inflator 400' that is a variation of the inflator 400 shown in FIG. 4A. In the inflator 400', the outlet $434_1$ is coupled to the inlet $432_2$ by a gas line 442. The inflator 400' includes a pressure sensor $462_1$ and a flow rate sensor $464_1$ on the gas line 442. The inflator 400' also includes a pressure sensor $462_2$ and a flow rate sensor $464_2$ on the gas line 440 between the outlet $434_2$ and the nozzle 406. Having a set of the pressure sensor $462_1$ and the flow rate sensor $464_1$ on the gas line 442 between the gas moving device $430_1$ and the gas moving device $430_2$ may enable independent testing, calibration, and or feedback for the gas moving device $430_1$. Similarly, having another set of the pressure sensor $462_2$ and the flow rate sensor $464_2$ on the gas line 440 between the gas moving device $430_2$ and the nozzle 406 may enable independent testing, calibration, and or feedback for the gas moving device $430_2$.

Figure 4C:
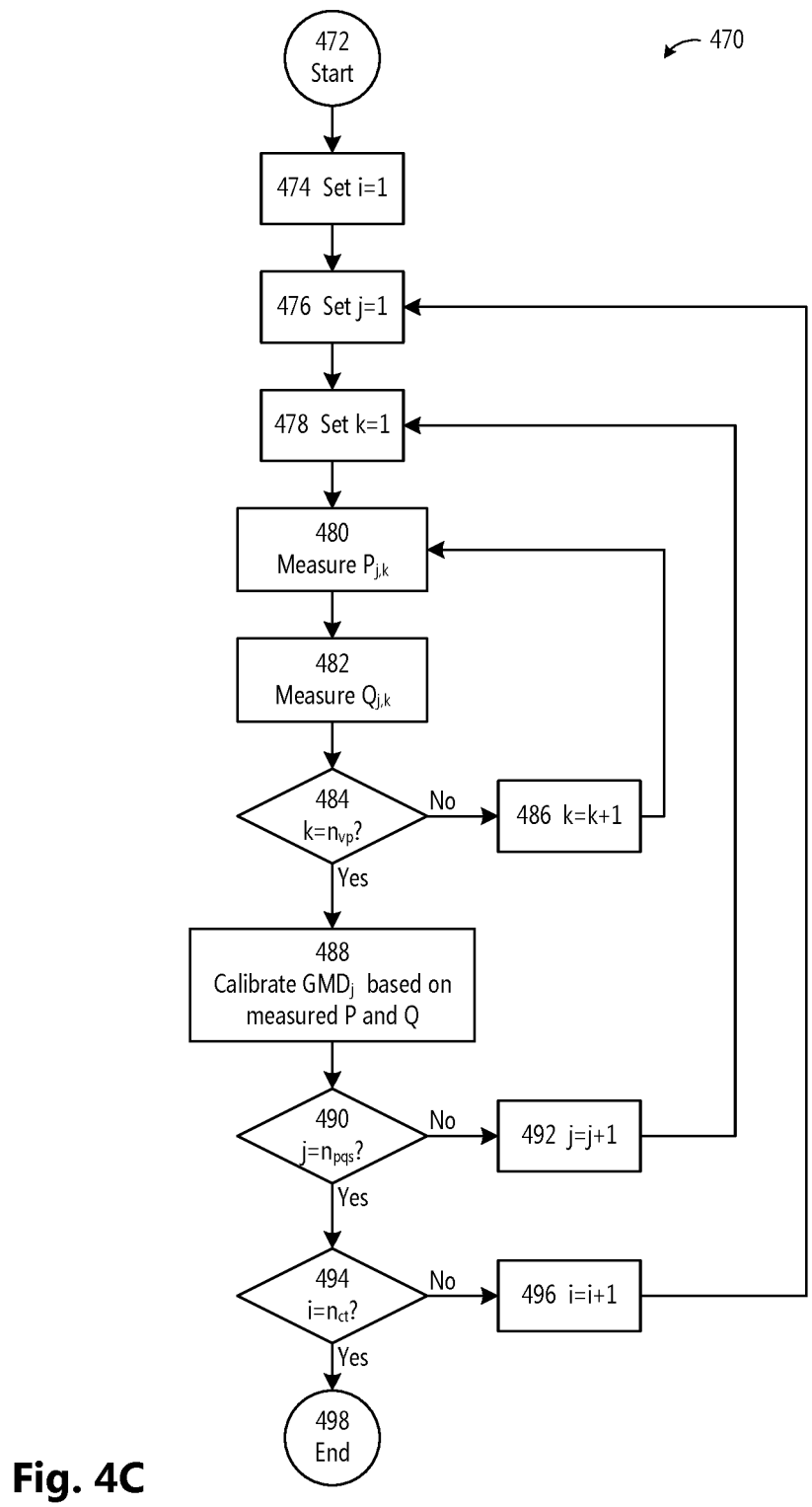
FIG. 4C depicts an embodiment of a method of calibrating pressure and flow rate sensors in the inflator shown in FIG. 4B.

FIG. 4C depicts an embodiment of a method 470 of calibrating pressure and flow rate sensors in an inflator. For illustrative purposes, the method 470 is described below using the example of the method 470 performed on the inflator 400'; however, it will be apparent that the method 470 coupled be performed on the inflator 400 or any other such inflator. At block 472, the method 470 of calibrating the pressure and flow rate sensors in the inflator starts. The method 470 then proceeds to block 474, where a counter i is set to 1. In the depicted embodiment, the counter i counts up to the number of times that a number of calibration tests $n_{ct}$ will be run on each set of pressure and flow rate sensors in the inflator. For example, the number of calibration tests $n_{ct}$ or that will be run on each set of pressure and flow rate sensors in the inflator could be two. The method 470 then proceeds to block 476, where a counter j is set to 1. In the depicted embodiment, the counter j counts up to the number of sets of pressure and flow rate sensors $n_{pqs}$ in the inflator. In the inflator 400', the number of sets of pressure and flow rate sensors is two: (1) pressure sensor $462_1$ and flow rate sensor $464_1$, and (2) pressure sensor $462_2$ and flow rate sensor $464_2$. The method 470 then proceeds to block 478, where a counter k is set to 1. In the depicted embodiment, the counter k counts up to the number voltage points $n_{vp}$ at which one or more gas moving devices in the inflator will be set during each calibration test. For example, if the one or more gas moving devices will be tested at 5 volts, 10 volts, and 24 volts during each calibration test, then $n_{vp}$ would be three for each of the three voltage points. The embodiment of three voltage points—5, 10, and 24 volts—will be used below for illustrative purposes; however, it will be apparent that any number of voltage points could be used and the values of those voltage point could vary from those used in this one example.

The method 470 then proceeds to block 480, where the pressure $P_{j,k}$ is measured by the jth pressure sensor at the kth voltage point. In the illustrative example where j=1 and k=1, the pressure $P_{j,k}$ is measured by the pressure sensor $462_1$ while the gas moving device $430_1$ is powered at 5 volts. The method 470 then proceeds to block 482, where the flowrate $Q_{j,k}$ is measured by the jth flow rate sensor at the kth voltage point. In the illustrative example where j=1 and k=1, the flow rate $Q_{j,k}$ is measured by the flow rate sensor $464_1$ while the gas moving device $430_1$ is powered at 5 volts. The method 470 then proceeds to block 484, where a determination is made whether the counter k equals the number of voltage points $n_{vp}$. In the illustrative embodiment, the counter k is 1 and the number of voltage points $n_{vp}$ is 3. If the counter k equals the number of voltage points $n_{vp}$ at block 484, then the method proceeds to block 486, where the counter k is advanced by 1 and the method 470 loops back to block 480. In the illustrative embodiment, the measurements at blocks 480 and 482 are again taken where k=2 (e.g., when the gas moving device $430_1$ is powered at 10 volts) and then it is determined at block 484 that the counter k (k is 2) does not equal the number of voltage points $n_{vp}$ ($n_{vp}$ is 3). At that point, the counter k is advanced by 1 at block 486 so that k is 3, then the measurements at blocks 480 and 482 are again taken where k=3 (e.g., when the gas moving device $430_1$ is powered at 24 volts), and then it is determined at block 484 that the counter k (k is 3) equals the number of voltage points $n_{vp}$ ($n_{vp}$ is 3).

When it is determined at block 484 that the counter k equals the number of voltage points $n_{vp}$, the method 470 proceeds to block 488. At block 488, the inflator is calibrated for the jth gas moving device based on the measured pressure and flow rate at blocks 480 and 482. In some embodiments, calibration includes creating calibration curves for pressure and flow rate of the jth gas moving device based on the measured pressure and flow rate at blocks 480 and 482 for each of the voltage points. In some embodiments, calibration includes adjusting the power settings for the jth gas moving device based on the calculated calibration curved. For example, the pulse width modulation (PWM) percentage for the jth gas moving device can be adjusted to reflect a baseline stored in a lookup table. From there, the method 470 proceeds to block 490.

At block 490, a decision is made whether the counter j equals the number of sets of pressure and flow rate sensors $n_{pqs}$ in the inflator. In the illustrative example, when the counter j is 1 and the number of sets of pressure and flow rate sensors $n_{pqs}$ in the inflator is 2, the method 470 proceeds to block 492 where the counter j is incremented from 1 to 2. The method 470 then returns to block 478 and repeats the portion of the method between block 478 and block 488 for the second set of pressure and flow rate sensors in the inflator. In the illustrative embodiment, this means powering the gas moving device $430_2$ and measuring the pressure and flow rate using the pressure sensor $462_2$ and the flow rate sensor $464_2$. When the method 470 again returns to block 490, a determination is made that the number counter j (j is 2) is equal to the number of sets of pressure and flow rate sensors $n_{pqs}$ ($n_{pqs}$ is 2). From there, the method 470 proceeds to block 494.

At block 494, a decision is made whether the counter i equals the number of number of calibration tests $n_{ct}$ that will be run on the inflator. Running multiple, successive calibration tests can significantly increase the accuracy of the operation of the gas moving devices in the inflator such that the inflator is able to inflate an inflatable web with an accurate pressure and/or flow rate. In the illustrative embodiment, when the counter i is 1 and the number of calibration tests $n_{ct}$ is 2, the method 470 proceeds to block 496 where the counter i is incremented from 1 to 2. The method 470 then returns to block 476 and repeats the portion of the method between block 476 and block 494 for the second time. In some embodiments, the second calibration can start with the results of the first calibration and the further calibrate the inflator. When the method 470 returns to block 494, the determination is made that the number counter k (k is 2) is equal to the number of calibration tests $n_{ct}$ ($n_{ct}$ is 2). From there, the method 470 proceeds to block 498 where the method 470 of calibration ends.

In the depicted embodiment, the method 470 is an independent calibration of the gas moving devices $430_1$ and $430_2$ in the inflator 400'. This independent calibration can allow for greater accuracy of each of the gas moving devices $430_1$ and $430_2$ individually and, therefore, the gas moving devices $430_1$ and $430_2$ collectively when placed in series with each other.

Figure 5:
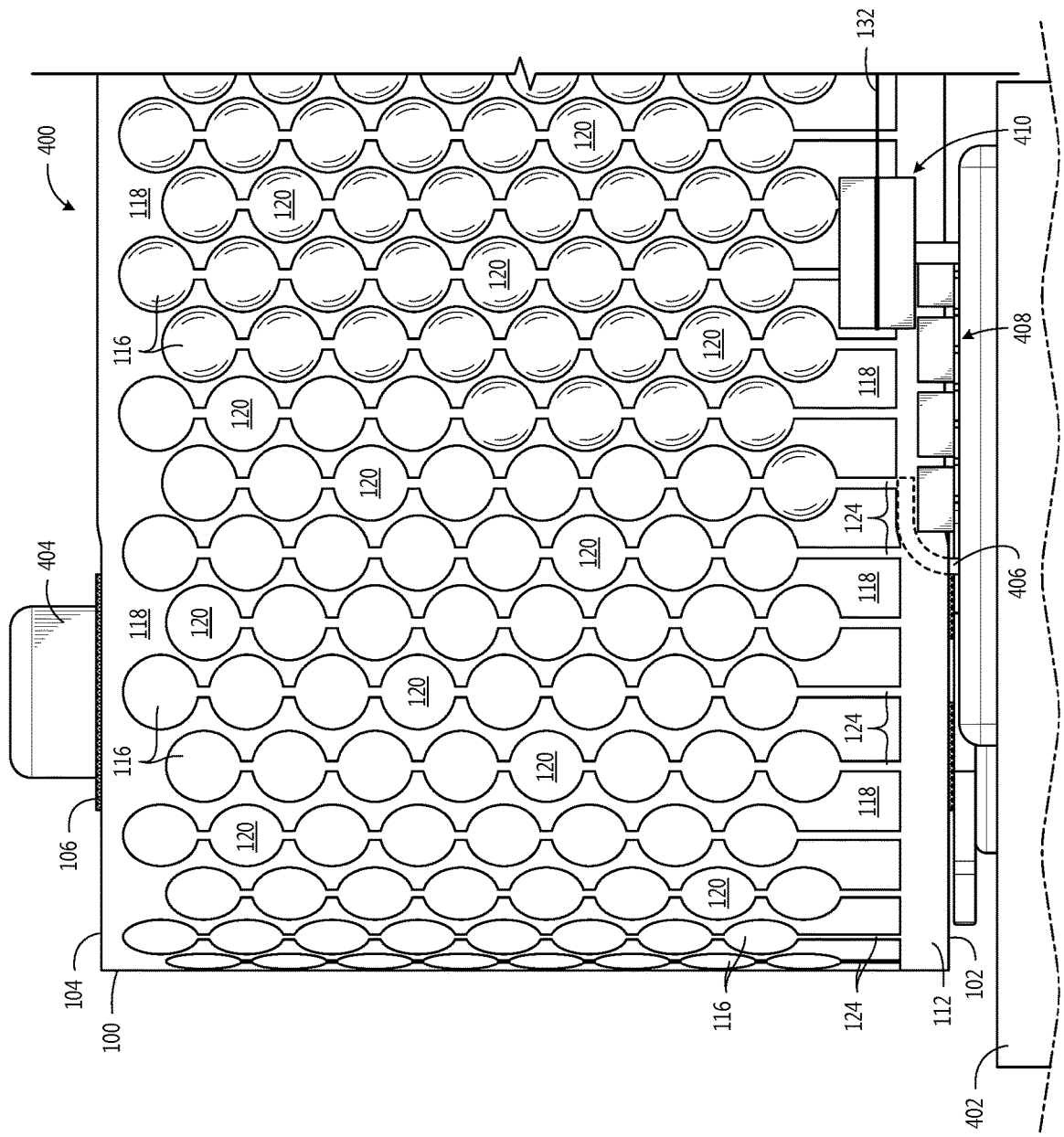
FIG. 5 depicts an embodiment of the inflator shown in FIG. 4A being used to inflate the inflatable web shown in FIG. 1A, in accordance with the embodiments described herein.

FIG. 5 depicts an embodiment of the inflator 400 being used to inflate the inflatable web 100. In the depicted embodiment, the inflatable web 100 has been wound into a roll on a core 106. The web supply holding device 404 includes a spindle and the core 106 has been slid onto the spindle. In some embodiments, the core 106 may have a wireless tag (e.g., an RFID tag) attached thereto for reading by the wireless receiver 466 so that the computing device 460 can determine the type of the inflatable web 100.

In the instance depicted in FIG. 5, the inflatable web 100 is being fed from the web supply holding device 404, past the nozzle 406, and through the engagement system 408 and the seal system 410. In some embodiments, one or both of the engagement system 408 or the seal system 410 is driven by the actuator 420 to feed the inflatable web 100 along this path. In some embodiments, the speed that the inflatable web 100 is fed is based on the type of the inflatable web 100 determined by the computing device 460. The chambers 116 of the inflatable web 100 are being inflated by gas from the nozzle 406, the inflation channel 112 is being held closed by the engagement system 408, and the seal system 410 is forming a seal 132 across the ports 124 of the chambers 116. In some embodiments, the pressure and/or flow rate of the gas exiting the nozzle 406 is based on the type of the inflatable web 100 determined by the computing device 460.

The computing device 460 can control one or both of the feeding of the inflatable web 100 or the inflation of the chambers 116 by controlling operation of one or more of the engagement system 408, the seal system 410, the actuator 420, or the gas moving devices $430_1$ and $430_2$. In some embodiments, the computing device 460 adjusts the settings of components of the inflator 400 for inflation of the inflatable web 100 in response to the inflatable web 100 being loaded on the web supply holding device 404. For example, if the inflator was previously turned "off" before the inflatable web 100 was loaded on the web supply holding device 404, the computing device 460 can adjust the settings of the inflator 400 from initial or default settings to settings for inflation of the inflatable web 100 in response to the inflatable web 100 being loaded on the web supply holding device 404.

Figure 6:
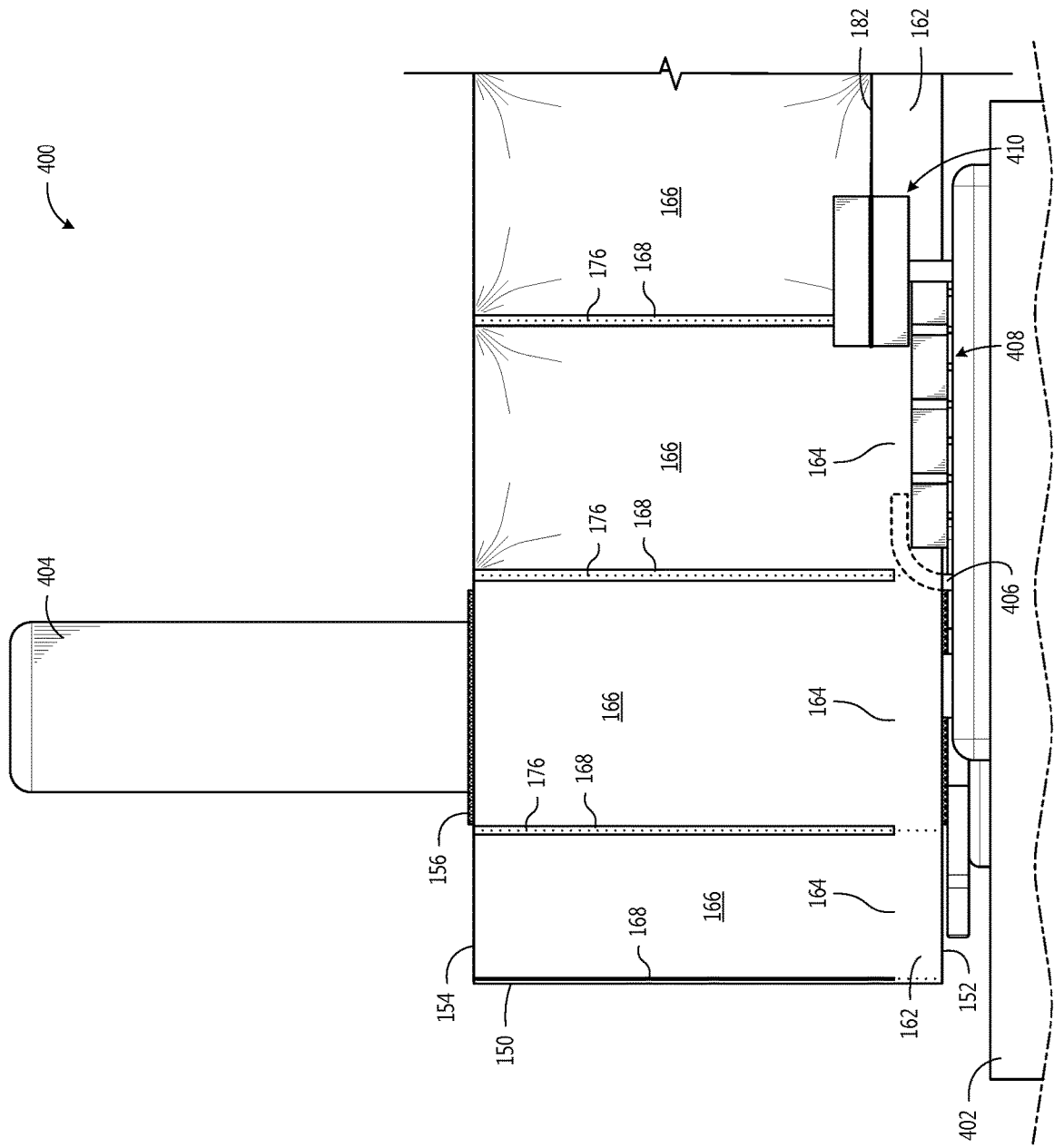
FIG. 6 depicts an embodiment of the inflator shown in FIG. 4A being used to inflate the inflatable web shown in FIG. 1B, in accordance with the embodiments described herein.

FIG. 6 depicts an embodiment of the inflator 400 being used to inflate the inflatable web 150. In the depicted embodiment, the inflatable web 150 has been wound into a roll on a core 156. The web supply holding device 404 includes a spindle and the core 156 has been slid onto the spindle. In some embodiments, the core 156 may have a wireless tag (e.g., an RFID tag) attached thereto for reading by the wireless receiver 466 so that the computing device 460 can determine the type of the inflatable web 150.

In the instance depicted in FIG. 6, the inflatable web 150 is being fed from the web supply holding device 404, past the nozzle 406, and through the engagement system 408 and the seal system 410. In some embodiments, one or both of the engagement system 408 or the seal system 410 is driven by the actuator 420 to feed the inflatable web 150 along this path. In some embodiments, the speed that the inflatable web 150 is fed is based on the type of the inflatable web 150 determined by the computing device 460. The chambers 166 of the inflatable web 150 are being inflated by gas from the nozzle 406, the inflation channel 162 is being held closed by the engagement system 408, and the seal system 410 is forming a seal 182 across the ports 164 of the chambers 166. In some embodiments, the pressure and/or flow rate of the gas exiting the nozzle 406 is based on the type of the inflatable web 150 determined by the computing device 460.

The computing device 460 can control one or both of the feeding of the inflatable web 150 or the inflation of the chambers 166 by controlling operation of one or more of the engagement system 408, the seal system 410, the actuator 420, or the gas moving devices $430_1$ and $430_2$. In some embodiments, the computing device 460 adjusts the settings of components of the inflator 400 for inflation of the inflatable web 150 in response to the inflatable web 150 being loaded on the web supply holding device 404. For example, if the inflator was previously set to inflate the inflatable web 100 before the inflatable web 150 was loaded on the web supply holding device 404, the computing device 460 can adjust the settings of the inflator 400 from settings for inflation of the inflatable web 100 to settings for inflation of the inflatable web 150 in response to the inflatable web 150 being loaded on the web supply holding device 404.

Figure 7:
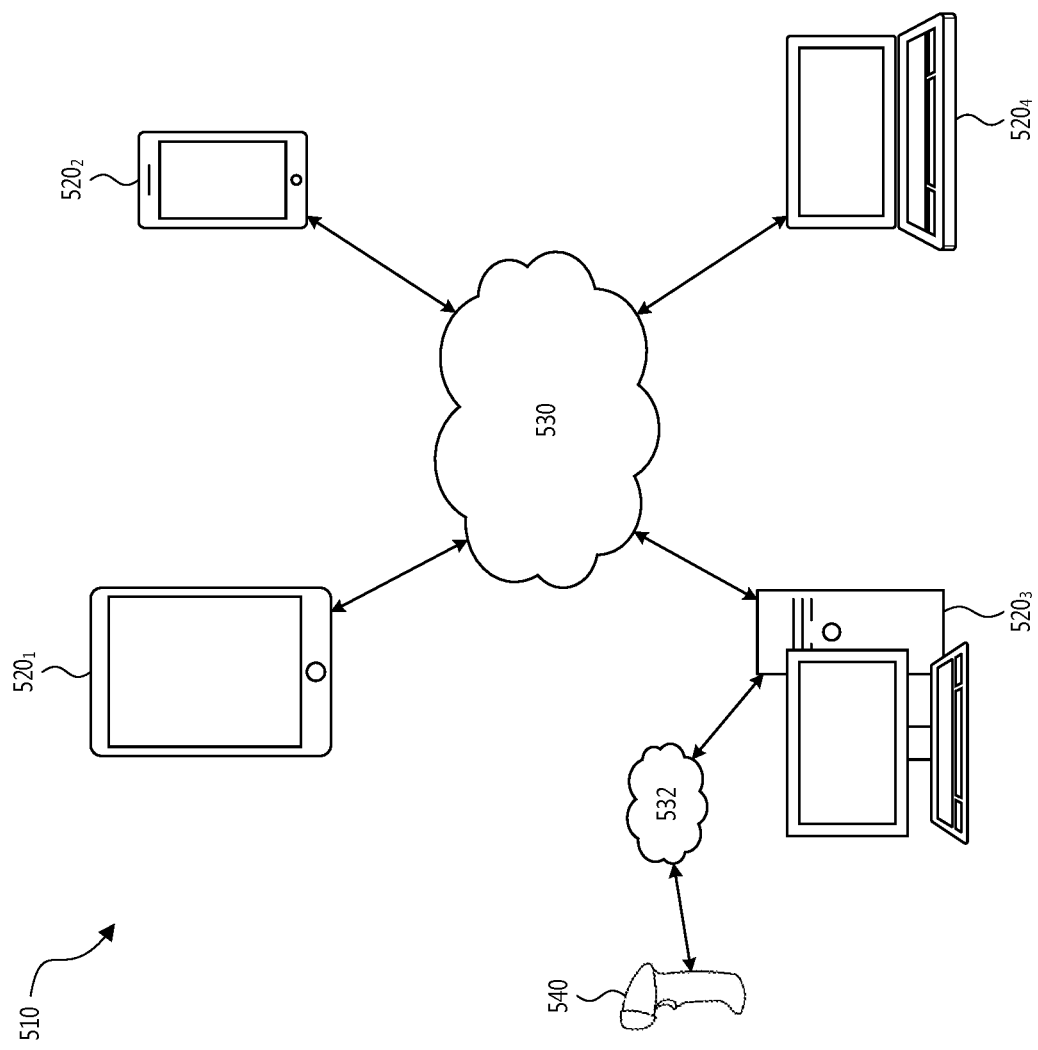
FIG. 7 depicts an example embodiment of a system that may be used to implement some or all of the embodiments described herein.

FIG. 7 depicts an example embodiment of a system 510 that may be used to implement some or all of the embodiments described herein. In the depicted embodiment, the system 510 includes computing devices $520_1$, $520_2$, $520_3$, and $520_4$ (collectively computing devices 520). In the depicted embodiment, the computing device $520_1$ is a tablet, the computing device $520_2$ is a mobile phone, the computing device $520_3$ is a desktop computer, and the computing device $520_4$ is a laptop computer. In other embodiments, the computing devices 520 include one or more of a desktop computer, a mobile phone, a tablet, a phablet, a notebook computer, a laptop computer, a distributed system, a gaming console (e.g., Xbox, Play Station, Switch), a watch, a pair of glasses, a key fob, a radio frequency identification (RFID) tag, an ear piece, a scanner, a television, a dongle, a camera, a wristband, a wearable item, a kiosk, an input terminal, a server, a server network, a blade, a gateway, a switch, a processing device, a processing entity, a set-top box, a relay, a router, a network access point, a base station, any other device configured to perform the functions, operations, and/or processes described herein, or any combination thereof.

The computing devices 520 are communicatively coupled to each other via one or more networks 530 and 532. Each of the networks 530 and 532 may include one or more wired or wireless networks (e.g., a 3G network, the Internet, an internal network, a proprietary network, a secured network). The computing devices 520 are capable of communicating with each other and/or any other computing devices via one or more wired or wireless networks. While the particular embodiment of the system 510 in FIG. 7 depicts the computing devices 520 communicatively coupled via the network 530 include four computing devices, any number of computing devices may be communicatively coupled via the network 530.

In the depicted embodiment, the computing device $520_3$ is communicatively coupled with a peripheral device 540 via the network 532. In the depicted embodiment, the peripheral device 540 is a scanner, such as a barcode scanner, an optical scanner, a computer vision device, and the like. In some embodiments, the network 532 is a wired network (e.g., a direct wired connection between the peripheral device 540 and the computing device $520_3$), a wireless network (e.g., a Bluetooth connection or a WiFi connection), or a combination of wired and wireless networks (e.g., a Bluetooth connection between the peripheral device 540 and a cradle of the peripheral device 540 and a wired connection between the peripheral device 540 and the computing device $520_3$). In some embodiments, the peripheral device 540 is itself a computing device (sometimes called a "smart" device). In other embodiments, the peripheral device 540 is not a computing device (sometimes called a "dumb" device).

Figure 8:
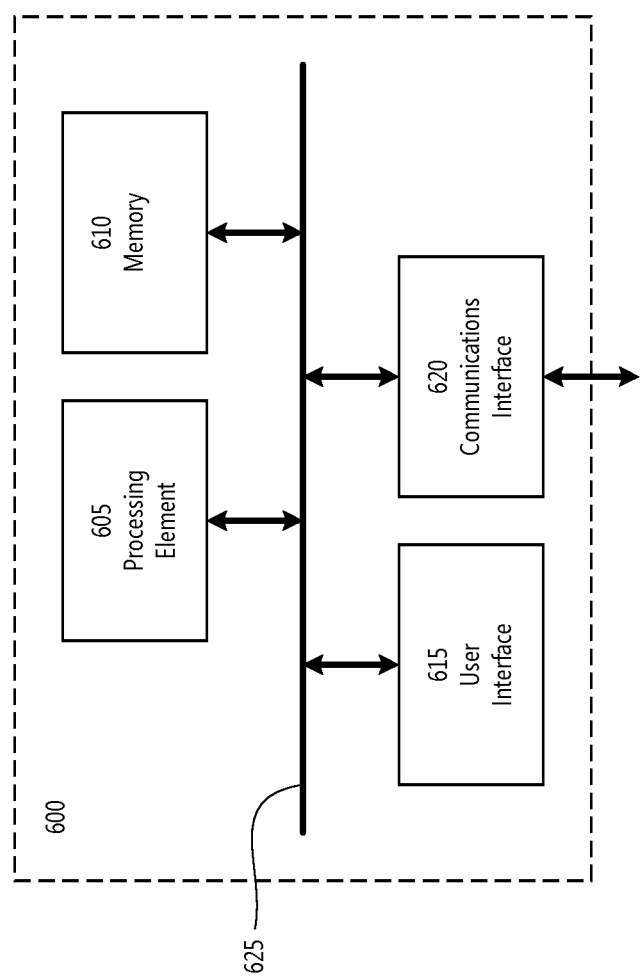
FIG. 8 depicts a block diagram of an embodiment of a computing device, in accordance with the embodiments described herein.

Depicted in FIG. 8 is a block diagram of an embodiment of a computing device 600. Any of the computing devices 520 and/or any other computing device described herein may include some or all of the components and features of the computing device 600. In some embodiments, the computing device 600 is one or more of a desktop computer, a mobile phone, a tablet, a phablet, a notebook computer, a laptop computer, a distributed system, a gaming console (e.g., an Xbox, a Play Station, a Wii), a watch, a pair of glasses, a key fob, a radio frequency identification (RFID) tag, an ear piece, a scanner, a television, a dongle, a camera, a wristband, a wearable item, a kiosk, an input terminal, a server, a server network, a blade, a gateway, a switch, a processing device, a processing entity, a set-top box, a relay, a router, a network access point, a base station, any other device configured to perform the functions, operations, and/or processes described herein, or any combination thereof. Such functions, operations, and/or processes may include, for example, transmitting, receiving, operating on, processing, displaying, storing, determining, creating/generating, monitoring, evaluating, comparing, and/or similar terms used herein. In one embodiment, these functions, operations, and/or processes can be performed on data, content, information, and/or similar terms used herein.

In the depicted embodiment, the computing device 600 includes a processing element 605, memory 610, a user interface 615, and a communications interface 620. The processing element 605, memory 610, a user interface 615, and a communications interface 620 are capable of communicating via a communication bus 625 by reading data from and/or writing data to the communication bus 625. The computing device 600 may include other components that are capable of communicating via the communication bus 625. In other embodiments, the computing device does not include the communication bus 625 and the components of the computing device 600 are capable of communicating with each other in some other way.

The processing element 605 (also referred to as one or more processors, processing circuitry, and/or similar terms used herein) is capable of performing operations on some external data source. For example, the processing element may perform operations on data in the memory 610, data receives via the user interface 615, and/or data received via the communications interface 620. As will be understood, the processing element 605 may be embodied in a number of different ways. In some embodiments, the processing element 605 includes one or more complex programmable logic devices (CPLDs), microprocessors, multi-core processors, co processing entities, application-specific instruction-set processors (ASIPs), microcontrollers, controllers, integrated circuits, application specific integrated circuits (ASICs), field programmable gate arrays (FPGAs), programmable logic arrays (PLAs), hardware accelerators, any other circuitry, or any combination thereof. The term circuitry may refer to an entirely hardware embodiment or a combination of hardware and computer program products. In some embodiments, the processing element 605 is configured for a particular use or configured to execute instructions stored in volatile or nonvolatile media or otherwise accessible to the processing element 605. As such, whether configured by hardware or computer program products, or by a combination thereof, the processing element 605 may be capable of performing steps or operations when configured accordingly.

The memory 610 in the computing device 600 is configured to store data, computer-executable instructions, and/or any other information. In some embodiments, the memory 610 includes volatile memory (also referred to as volatile storage, volatile media, volatile memory circuitry, and the like), non-volatile memory (also referred to as non-volatile storage, non-volatile media, non-volatile memory circuitry, and the like), or some combination thereof.

In some embodiments, volatile memory includes one or more of random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, any other memory that requires power to store information, or any combination thereof.

In some embodiments, non-volatile memory includes one or more of hard disks, floppy disks, flexible disks, solid-state storage (SSS) (e.g., a solid state drive (SSD)), solid state cards (SSC), solid state modules (SSM), enterprise flash drives, magnetic tapes, any other non-transitory magnetic media, compact disc read only memory (CD ROM), compact disc-rewritable (CD-RW), digital versatile disc (DVD), Blu-ray disc (BD), any other non-transitory optical media, read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, Memory Sticks, conductive-bridging random access memory (CBRAM), phase-change random access memory (PRAM), ferroelectric random-access memory (FeRAM), non-volatile random access memory (NVRAM), magneto-resistive random access memory (MRAM), resistive random-access memory (RRAM), Silicon Oxide-Nitride-Oxide-Silicon memory (SONOS), floating junction gate random access memory (FJG RAM), Millipede memory, racetrack memory, any other memory that does not require power to store information, or any combination thereof.

In some embodiments, memory 610 is capable of storing one or more of databases, database instances, database management systems, data, applications, programs, program modules, scripts, source code, object code, byte code, compiled code, interpreted code, machine code, executable instructions, or any other information. The term database, database instance, database management system, and/or similar terms used herein may refer to a collection of records or data that is stored in a computer-readable storage medium using one or more database models, such as a hierarchical database model, network model, relational model, entity relationship model, object model, document model, semantic model, graph model, or any other model.

The user interface 615 of the computing device 600 is in communication with one or more input or output devices that are capable of receiving inputs into and/or outputting any outputs from the computing device 600. Embodiments of input devices include a keyboard, a mouse, a touchscreen display, a touch sensitive pad, a motion input device, movement input device, an audio input, a pointing device input, a joystick input, a keypad input, peripheral device 540, foot switch, and the like. Embodiments of output devices include an audio output device, a video output, a display device, a motion output device, a movement output device, a printing device, and the like. In some embodiments, the user interface 615 includes hardware that is configured to communicate with one or more input devices and/or output devices via wired and/or wireless connections.

The communications interface 620 is capable of communicating with various computing devices and/or networks. In some embodiments, the communications interface 620 is capable of communicating data, content, and/or any other information, that can be transmitted, received, operated on, processed, displayed, stored, and the like. Communication via the communications interface 620 may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, communication via the communications interface 620 may be executed using a wireless data transmission protocol, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (WiFi), WiFi Direct, 802.16 (WiMAX), ultra wideband (UWB), infrared (IR) protocols, near field communication (NFC) protocols, Wibree, Bluetooth protocols, wireless universal serial bus (USB) protocols, or any other wireless protocol.

As will be appreciated by those skilled in the art, one or more components of the computing device 600 may be located remotely from other components of the computing device 600 components, such as in a distributed system. Furthermore, one or more of the components may be combined and additional components performing functions described herein may be included in the computing device 600. Thus, the computing device 600 can be adapted to accommodate a variety of needs and circumstances. The depicted and described architectures and descriptions are provided for exemplary purposes only and are not limiting to the various embodiments described herein.

Embodiments described herein may be implemented in various ways, including as computer program products that comprise articles of manufacture. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

As should be appreciated, various embodiments of the embodiments described herein may also be implemented as methods, apparatus, systems, computing devices, and the like. As such, embodiments described herein may take the form of an apparatus, system, computing device, and the like executing instructions stored on a computer readable storage medium to perform certain steps or operations. Thus, embodiments described herein may be implemented entirely in hardware, entirely in a computer program product, or in an embodiment that comprises combination of computer program products and hardware performing certain steps or operations.

Embodiments described herein may be made with reference to block diagrams and flowchart illustrations. Thus, it should be understood that blocks of a block diagram and flowchart illustrations may be implemented in the form of a computer program product, in an entirely hardware embodiment, in a combination of hardware and computer program products, or in apparatus, systems, computing devices, and the like carrying out instructions, operations, or steps. Such instructions, operations, or steps may be stored on a computer readable storage medium for execution buy a processing element in a computing device. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically configured machines performing the steps or operations specified in the block diagrams and flowchart illustrations. Accordingly, the block diagrams and flowchart illustrations support various combinations of embodiments for performing the specified instructions, operations, or steps.

For purposes of this disclosure, terminology such as "upper," "lower," "vertical," "horizontal," "inwardly," "outwardly," "inner," "outer," "front," "rear," and the like, should be construed as descriptive and not limiting the scope of the claimed subject matter. Further, the use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Unless stated otherwise, the terms "substantially," "approximately," and the like are used to mean within 5% of a target value.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

What is claimed is:

1. An inflator for inflation of inflatable webs, the inflator comprising:
   a web supply holding device configured to hold a supply of an inflatable web;
   a first gas moving device having a first inlet and a first outlet, wherein the first gas moving device is configured to receive gas via the first inlet and expel gas via the first outlet;
   a second gas moving device having a second inlet and a second outlet, wherein the second gas moving device is configured to receive gas via the second inlet and expel gas via the second outlet, wherein the first outlet is coupled to the second inlet such that gas expelled from the first outlet is received by the second inlet; and
   a nozzle coupled to the second outlet, wherein the nozzle is configured to insert gas expelled from the second outlet into chambers of the inflatable web to inflate the inflatable web;
   wherein parameters of the first and second gas moving devices are selected based on a type of the inflatable web.

2. The inflator of claim 1, wherein the parameters of the first and second gas moving devices comprise a pressure setting of the first gas moving device.

3. The inflator of claim 2, wherein the parameters of the second gas moving device further comprise one or both of a flow rate setting of the second gas moving device or a pressure of the second gas moving device.

4. The inflator of claim 1, further comprising:
   a computing device configured to control the parameters of the first and second gas moving devices.

5. The inflator of claim 4, wherein the computing device is configured to identify the type of the inflatable web before controlling the parameters of the first and second gas moving devices.

6. The inflator of claim 5, wherein the computing device is configured to independently adjust the parameters of the first and second gas moving devices between a set of parameters for an inflatable cushioning material and a set of parameters for an inflatable void fill material.

7. The inflator of claim 5, further comprising:
   a device communicatively coupled to the computing device and configured to receive information about the type of the inflatable web and to communicate the information about the type of the inflatable web to the computing device.

8. The inflator of claim 7, wherein the device includes a radio frequency identification (RFID) receiver configured to receive the information about the type of the inflatable web from an RFID tag coupled to the supply of the inflatable web.

9. The inflator of claim 7, wherein the device includes a user interface configured to receive an input from a user indicative of the information about the type of the inflatable web.

10. The inflator of claim 7, wherein the device includes a scanner configured to scan a code on the supply of the inflatable web, wherein the information about the type of the inflatable web is encoded in the code.

11. The inflator of claim 5, further comprising:
    a seal system configured to form a seal in the inflatable web to close the chambers; and
    an actuator configured to drive the seal system, wherein the seal system is configured to feed the inflatable web when driven by the actuator.

12. The inflator of claim 11, wherein the computing device is configured to control the actuator based on a feed rate for the type of the inflatable web.

13. The inflator of claim 5, further comprising:
    a pressure sensor positioned between the second outlet and the nozzle, wherein the pressure sensor is configured to detect pressure in the gas expelled via the second outlet.

14. The inflator of claim 13, wherein the parameters of the first and second gas moving devices include a pressure for inflation of the inflatable web, and wherein the computing device is configured to control one of the first and second gas moving devices based on the pressure detected by the pressure sensor and the pressure for inflation of the inflatable web.

15. The inflator of claim 5, further comprising:
    a flow rate sensor positioned between the second outlet and the nozzle, wherein the flow rate sensor is configured to detect a flow rate in the gas expelled via the second outlet.

16. The inflator of claim 15, wherein the parameters of the first and second gas moving devices include a flow rate for inflation of the inflatable web, and wherein the computing device is configured to control one of the first and second gas moving devices based on the flow rate detected by the flow rate sensor and the flow rate for inflation of the inflatable web.

17. The inflator of claim 5, further comprising:
    a first pressure sensor positioned between the first outlet and the second inlet, wherein the first pressure sensor is configured to detect pressure in the gas expelled via the first outlet;
    a first flow rate sensor positioned between the first outlet and the second inlet, wherein the first flow rate sensor is configured to detect a flow rate in the gas expelled via the first outlet;
    a second pressure sensor positioned between the second outlet and the nozzle, wherein the second pressure sensor is configured to detect pressure in the gas expelled via the second outlet; and
    a second flow rate sensor positioned between the second outlet and the nozzle, wherein the second flow rate sensor is configured to detect a flow rate in the gas expelled via the second outlet.

18. The inflator of claim 17, further comprising:
    a computing device configured to independently calibrate the first and second gas moving devices;
    wherein calibration of the first gas moving device is based on the pressure measured by the first pressure sensor and the flow rate measured by the first flow rate sensor; and
    wherein calibration of the second gas moving device is based on the pressure measured by the second pressure sensor and the flow rate measured by the second flow rate sensor.

19. The inflator of claim 1, wherein each of the first and second gas moving devices is one of a fan, a blower, or a compressor.

20. The inflator of claim 1, wherein each of the first and second gas moving devices is a blower.

\* \* \* \* \*